(12) United States Patent
Eller et al.

(10) Patent No.: US 9,174,301 B2
(45) Date of Patent: Nov. 3, 2015

(54) METHOD AND APPARATUS FOR FRICTION STIR WELDING TUBE ENDS FOR A HEAT EXCHANGER

(75) Inventors: Michael R. Eller, New Orleans, LA (US); Zhixian Li, Slidell, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/571,060

(22) Filed: Aug. 9, 2012

(65) Prior Publication Data

US 2013/0037601 A1 Feb. 14, 2013

Related U.S. Application Data

(60) Provisional application No. 61/521,589, filed on Aug. 9, 2011.

(51) Int. Cl.
| | |
|---|---|
| *B23K 20/12* | (2006.01) |
| *B23K 37/053* | (2006.01) |
| *F28F 9/18* | (2006.01) |
| *F28D 7/16* | (2006.01) |

(52) U.S. Cl.
CPC ............. *B23K 20/126* (2013.01); *B23K 20/129* (2013.01); *B23K 37/0536* (2013.01); *F28D 7/16* (2013.01); *F28F 9/18* (2013.01); *F28F 2275/062* (2013.01)

(58) Field of Classification Search
CPC ............. B23K 37/0531; B23K 20/126; B23K 20/129; B23K 20/122; B23K 20/1265; B23K 2201/14; B23K 20/085; B23K 20/1255; B23K 2201/06; B23K 35/004; B23K 37/0533; B23K 37/0536; B23K 9/0288
USPC .................................. 228/112.1, 113, 114, 2.1
See application file for complete search history.

(56) References Cited

U.S. PATENT DOCUMENTS

| | | | |
|---|---|---|---|
| 2,736,286 A | | 2/1956 | Britton et al. |
| 3,109,477 A | * | 11/1963 | Avera et al. ..................... 72/466 |

(Continued)

FOREIGN PATENT DOCUMENTS

| | | |
|---|---|---|
| DE | 34 12 494 C1 | 8/1985 |
| JP | 56-066380 A | 4/1981 |

(Continued)

OTHER PUBLICATIONS

International Search Report for corresponding International Application No. PCT/US2012/050183 mailed on May 4, 2013.

(Continued)

*Primary Examiner* — Erin Saad
(74) *Attorney, Agent, or Firm* — Withrow & Terranova, PLLC (57) ABSTRACT

A method for forming a joint between a tube and a sheet includes forming an anvil at least within the tube, and welding the tube to the sheet in the presence of the anvil. The anvil includes an anchor which is placed within the tube near or at the joint to be formed. At least one washer is placed over the end of the anchor that is near the joint to be formed. A threaded fastener is then placed into the anchor to securely hold the anchor within the tube and to provide a backing substantial enough so that a friction stir weld can be formed. The threaded fastener and the washer can be used as a guide for the friction stir weld. Once the weld is completed, the anvil can be removed. The weld can be further processed to remove burrs and other material.

21 Claims, 12 Drawing Sheets

(56) References Cited

U.S. PATENT DOCUMENTS

| | | | |
|---|---|---|---|
| 4,004,125 A | | 1/1977 | Hood et al. |
| 4,941,512 A | * | 7/1990 | McParland ............... 138/97 |
| 4,943,001 A | | 7/1990 | Meyer |
| 5,893,507 A | | 4/1999 | Ding et al. |
| 7,252,138 B2 | * | 8/2007 | Burkhalter et al. ......... 165/76 |
| 7,383,975 B2 | | 6/2008 | Stol et al. |
| 2003/0201307 A1 | | 10/2003 | Waldron et al. |
| 2004/0049915 A1 | | 3/2004 | Dunand-Roux et al. |
| 2006/0102699 A1 | | 5/2006 | Burton et al. |
| 2007/0102492 A1 | | 5/2007 | Nelson et al. |
| 2010/0084454 A1 | | 4/2010 | Maciel |
| 2010/0140321 A1 | | 6/2010 | Eller et al. |
| 2011/0000952 A1 | * | 1/2011 | Takeshita et al. ......... 228/112.1 |
| 2011/0127311 A1 | * | 6/2011 | Peterson et al. ........... 228/2.1 |

FOREIGN PATENT DOCUMENTS

| | | |
|---|---|---|
| JP | 61-108482 A | 5/1986 |
| JP | H11226759 A | 8/1999 |

OTHER PUBLICATIONS

Written Opinion for corresponding International Application No. PCT/US2012/050183 mailed on May 4, 2013.

International Preliminary Report on Patentability for corresponding International Application No. PCT/US2012/050183 mailed on Feb. 20, 2014.

Patent Examination Report No. 1 for Australian Patent Application No. 2012294366, issued Apr. 7, 2015, 3 pages.

Invitation to Pay Additional Fees and Partial International Search for PCT/US2012/050183, mailed Dec. 10, 2012, 6 pages.

International Search Report and Written Opinion for PCT/US2014/052501, mailed Dec. 5, 2014, 11 pages.

Notice of First Office Action for Chinese Patent Application No. 201280038475.9, issued Jun. 3, 2015, 21 pages.

* cited by examiner

METHOD AND APPARATUS FOR FRICTION STIR WELDING TUBE ENDS FOR A HEAT EXCHANGER

RELATED APPLICATIONS

This application claims the benefit under 35 U.S.C. §119(e) of prior U.S. Provisional Patent Application No. 61/521,589 filed Aug. 9, 2011, which is incorporated herein by reference.

TECHNICAL FIELD

Various embodiments described herein relate to a method and an apparatus for friction stir welding the tube ends of tubes in a heat exchanger to a tubesheet in a pressure vessel.

BACKGROUND

Common industrial heat exchangers include multiple tubes placed between two tubesheets and encapsulated in a pressure vessel shell. Fluids or gasses of differing temperatures are passed through the heat exchanger, transferring the heat energy from one medium to the other. The tubes may be press fit or welded in place. Where the separation of the liquids or gasses is critical, as in nuclear heat exchangers and chemical plants, the tubes must be welded in place and checked for leaks prior to entering service. The process of welding the heat exchanger tubes has many drawbacks including: (1) high labor costs to prepare and weld all of the tube joints via manual fusion welding techniques, (2) defect repair costs due to the complex manual or semi-automatic fusion welding process, and (3) increased corrosion susceptibility of the fusion welding joint. Corrosion is a major cause of working fluid contamination, especially where one of the systems is corrosive.

SUMMARY OF THE INVENTION

This invention implements a solid state weld joint to join the tubes to the tubesheets in a heat exchanger. The solid state weld joint is similar to a friction stir weld (FSW). The tubes and the tubesheet can be made of the same or similar material. The result is a weld formed using the same or similar materials. This replaces the current fusion weld process which, in many instances, forms a weld with a mixture of materials. The solid state weld joint of the invention eliminates significant costs, defects and improve performance through the elimination or reduction of long-term corrosion related failures.

DETAILED DESCRIPTION

Figure 15:
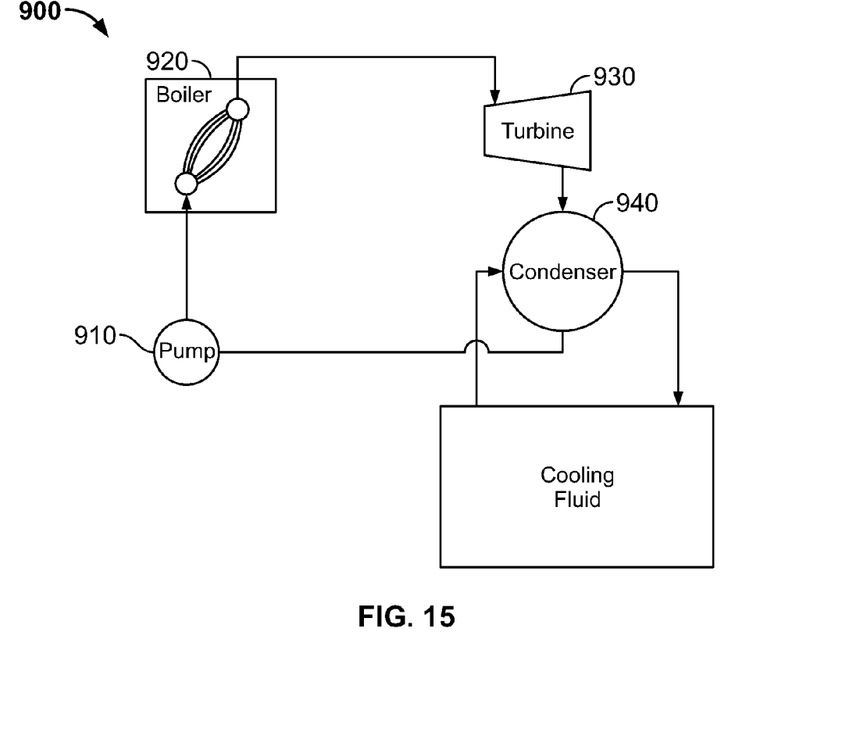
FIG. 15 is a schematic view of the Rankine cycle, according to an example embodiment.

FIG. 15 is a schematic diagram of the Rankine cycle 900. The cycle shown includes a pump 910, a boiler 920 a turbine 930 and a condenser 940. The condenser 940 includes a heat exchanger which uses a cooler fluid to remove heat from a gas after it has passed through the turbine 930. The cooler fluid can be corrosive. The gas may also be corrosive. So the heat exchanger associated with the condenser 940, in certain applications, operates in a corrosive environment. A heat exchanger can be formed in different ways. One from of heat exchanger includes multiple tubes placed between two tubesheets and encapsulated in a pressure vessel shell. The heat exchanger, therefore, includes one or more joints formed between a tube and a tube sheet. It should be understood that a heat exchanger is one application for the apparatus and method described herein and that there are other possible applications for the apparatus and method described herein.

Friction stir welding (FSW) is a solid-state joining process and offers several advantages over fusion welding processes including, for example, higher joint strength and lower distortion. Furthermore, a friction stir welding process can join alloys that may not be welded by fusion welding or other welding processes. These properties make a friction stir welding process a valuable joining process in many industries. FSW can be performed on aluminum or other high temperature tube alloys to form tube-to-tubesheet joints. However, the applicable markets for welded aluminum shell and tube heat exchangers is estimated to be only ~1% of the global shell and tube market. Conversely, welded carbon steel shell and tube heat exchangers account for approximately 70% of the global welded shell and tube market, with the remaining ~29% of welded shell and tube heat exchangers being constructed from stainless steel, titanium, and other high temperature alloys. Carbon steel is much more popular than aluminum (and other high temperature metals) because it is much less expensive per pound, withstands much higher pressures and temperatures, and is more compatible with harsh working fluids such as oils, gases, and acids. Therefore, the process of forming tube-to-tubesheet joints needs to be widely applicable to aluminum, aluminum alloys, carbon steel, stainless steel, titanium, and other high temperature tube alloys. By making the formation of tube-to-tubesheet joints widely applicable to as many high temperature tube alloys as possible, a larger share of applicable markets for heat exchangers can be addressed. Furthermore, by making the process of forming tube-to-tubesheet joints more robust, the higher the market acceptance of the process by the large share of applicable markets.

FSW high temperature tube-to-tubesheet joints is solved by using a novel anvil and related technique that can react the FSW loads, withstand the generated temperature, and does not contaminate the weld. When using FSW, a spinning tool can place a load on the joint. The anvil technique holds the joint so it can react or produce a counter force to the load produced by the tool during the welding process.

Figure 1A:
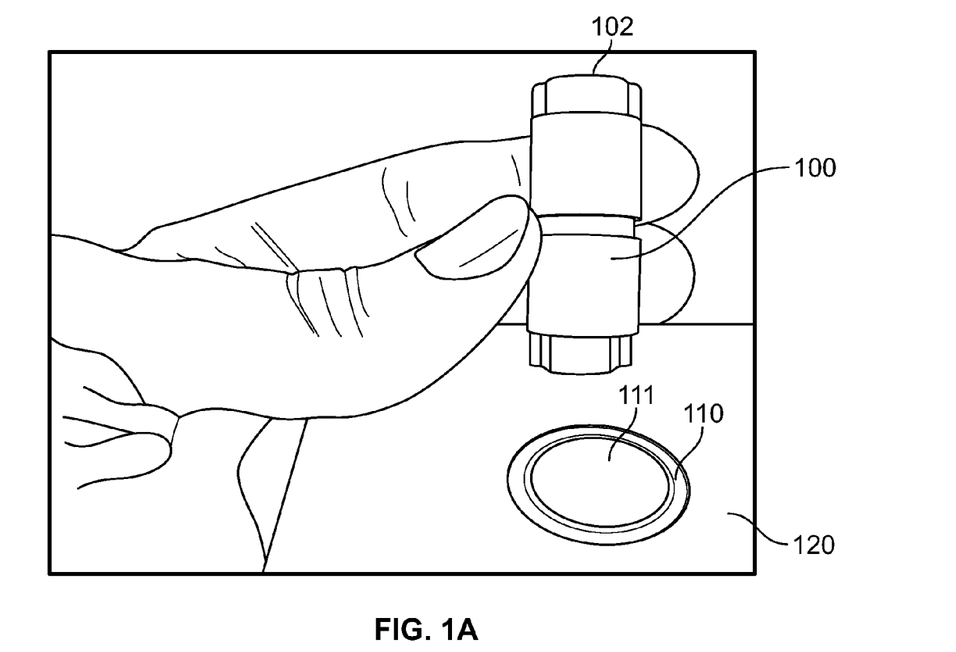
FIG. 1A is a perspective view of an anchor positioned near a tube end positioned with respect to a tubesheet, according to an example embodiment.
Figure 1B:
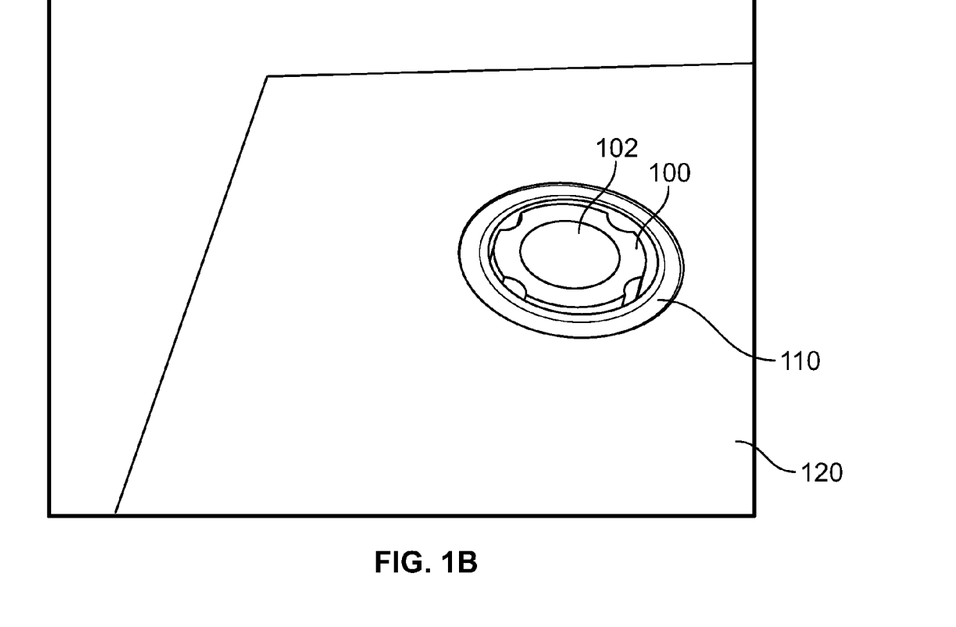
FIG. 1B is a perspective view of a tube end positioned with respect to a tubesheet with an anchor positioned within the tube end, according to an example embodiment.
Figure 2:
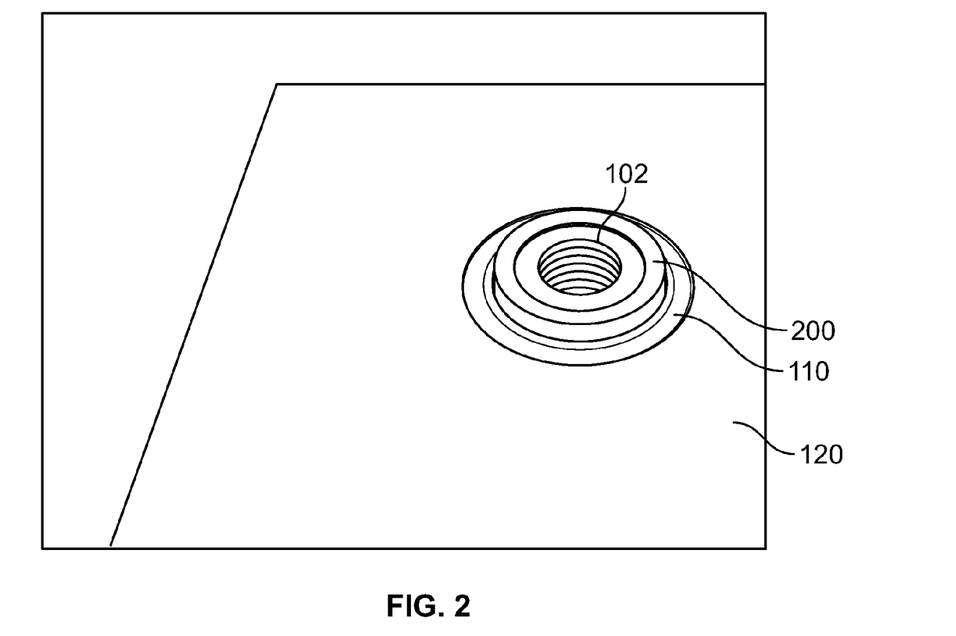
FIG. 2 is a perspective view of a washer positioned over the anchor insert in the tube end, according to an example embodiment.
Figure 3:
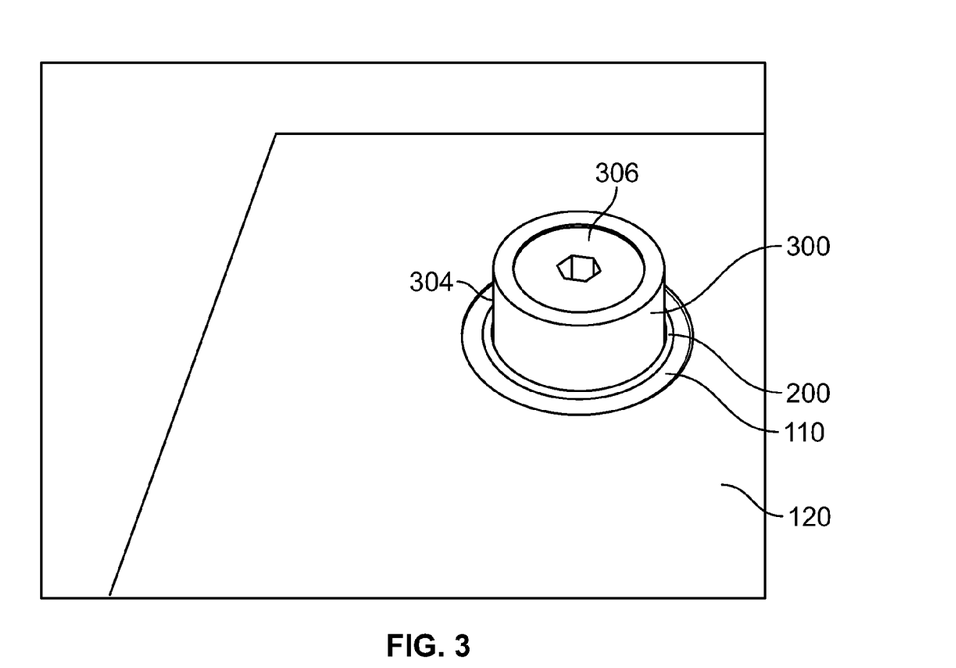
FIG. 3 is a perspective view of a socket head cap screw threaded into the anchor within the tube end, according to an example embodiment.

FIG. 1A is a perspective view of an anchor 100 near a tube end 110 positioned with respect to a tubesheet 120, and FIG. 1B is a perspective view of a tube end 110 positioned with respect to a tubesheet 120 with an anchor 100 positioned within the tube end 110 of the tube, according to an example embodiment. FIG. 2 is a perspective view of a washer 200 positioned over the anchor insert 100 in the tube end 110, according to an example embodiment. FIG. 3 is a perspective view of a socket head cap screw 300 threaded into the anchor 100 within the tube end 100, according to an example embodiment. Now referring to FIGS. 1A, 1B, 2 and 3, the first embodiment of the anvil assembly 310 will be further detailed. In a first embodiment, the anvil assembly 320 includes a concrete anchor 100, a socket head cap screw 300, and a washer 200. The anvil assembly 320 serves as a removable backer so that the tube 111, and more specifically the tube end 110 and tubesheet 120 can be welded using a friction stir weld tool and FSW technique. Without the anvil assembly 320, the FSW welding process is much more difficult to perform. The results are less consistent.

Figure 4:
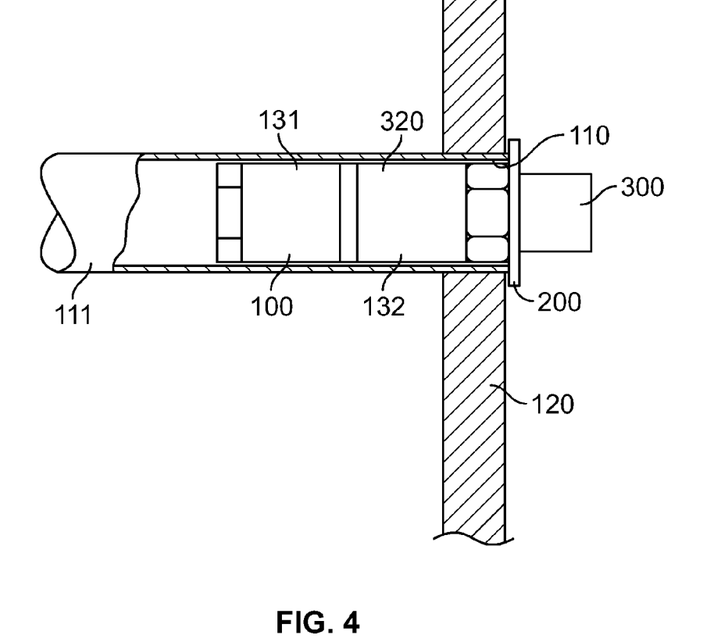
FIG. 4 is a partial cutaway side view of a tube and tube end that includes the anvil assembly, placed for use as a backer for a friction stir welding process, according to an example embodiment.

FIG. 4 is a partial cutaway side view of a tube 111 and tube end 110 that includes the anvil assembly 320, placed for use as a backer for a friction stir welding process, according to an example embodiment. The anvil assembly 320 formed includes a cylindrical top 300 (the annular surface of the socket head cap screw 300) which is used to guide and space the tool that performs the FSW and an anchor 100 which is anchored into the tube end 110 of the tube 111. The washer 200 is placed onto the anchor 100 which is positioned substantially flush with the tubesheet 120.

The anchor 100 includes a first body portion 131 and a second body portion 132. The first body portion 131 and the second body portion 132 abut an internal wedge (not shown). The anchor 100 has a threaded opening 102. The anchor 100 also has an internal wedge which may include at least a portion of the threaded opening 102. When the threaded opening 102 is engaged, the wedge is moved toward the one end of the anchor 100 which is substantially flush with the tubesheet 120 and the tube end 110 of the tube 111. The wedge acts as a lever to force the first body portion 131 and the second body portion 132 radially outward. This engages the tube 111 and specifically the tube end 110. This also results in a solid backer for the tube 111. As shown in FIG. 4, the socket head threaded portion 300 has a threaded end 302 which engages the internal threaded portion of the anchor 100. The socket head threaded portion 300 also has an annular head end 304.

As shown in FIG. 4, the annular head end 304 has a hexagonal opening 306 therein dimensioned to receive a driver, such as an allen wrench or the like. In some embodiments, the threaded head end 304 has a knurled external surface to allow for tightening and loosening the threaded end 302 using one's fingers. In other embodiments, the threaded head end 304 has a substantially smooth external surface to allow the shoulder 520 of a fixed pin tool to engage or pass over the external surface with little or no friction. The amount of force that is placed on the inside of the tube can be adjusted by varying the torque placed on the driver, such as an allen wrench. In addition, the anchor can be disengaged from the internal wall of the tube 111 and more specifically the tube end 110 by loosening the socket head threaded portion 300 from the threaded portion of the anchor 100. In other embodiments, the socket head threaded portion 300 can include other openings for receiving a driver. For example, socket head threaded portion 300 could have a slot for receiving a screwdriver or a Phillips opening for receiving a Phillips screwdriver.

As shown in FIG. 4, the socket head threaded portion 300 also holds washer 200 between the top of the tube end 110 and the bottom of the socket head threaded portion 300. The washer 200 is made of the same material as the tube 111 and the tubesheet 120. This assures that all the material forming the weld is of the same material. This lessens the chances of corrosion that can be driven by a voltaic reaction. The pin 520 spins and produces heat due to friction to heat the metal of the tube 111, the tube sheet 120 and the washer to weld the tube end 110 to the tubesheet 120.

Now turning back to FIGS. 1A, 1B, 2, 3 and 6, the assembly of the anvil assembly 320 in a tube end 110, according to an example embodiment, will now be detailed. Initially the tube end 110 is fit to a position where it substantially flush with the tube plate 120. The anchor 100 of the anvil assembly 320 is positioned near the tube end 110. The anchor 100 is then inserted into the tube end 110 and into the tube 111. The anchor 100 is inserted until the end having the threaded opening 102 is substantially flush with the tube end 111 and the tubesheet 120. In one embodiment, the tube end 110 or the portion of the tube 111 near the end is expanded to more closely fit within the opening in the tubesheet 120. The washer 200 is positioned on the anchor 100. The washer 200 will have one side that is substantially flush with the tube end 110 and the tubesheet 120. The other side of the washer 200 will be positioned slightly above the tubesheet 120 and tube end 110. The socket head cap screw 300 is inserted through washer 200 and into threaded portion 102 of anchor 100. The threaded end 302 of the socket head cap screw 300 is threadably engaged with the threaded portion 102 of the anchor 100.

A tool, such as an Allen wrench, screwdriver or other driver, is used to turn the socket head cap screw 300. For example, turning socket head cap screw 300 clockwise for right handed threads causes it to engage the internal wedges and force the body parts of the anchor into engagement with the walls of the tube 111. Initially the socket head cap screw 300 is tightened slightly, so as to allow the anchor to hold its position yet allow the anchor to be moved using a light push or pull on the socket head cap screw 300. In this way, the anchor can be positioned so that anchor is substantially flush with the tube 111 and tubesheet 120 interface. This positioning also positions the washer 200 at tube-to-tubesheet surface plane as the anchor 100 begins to expand and grip the inner walls of the tube 111. A final tightening torque is applied to socket head cap screw 300 so the socket head cap 300 is clamped tight on the washer 200 and the washer's 200 top surface is flush (or slightly proud) with respect to the tube-to-tubesheet surface plane.

Figure 6:
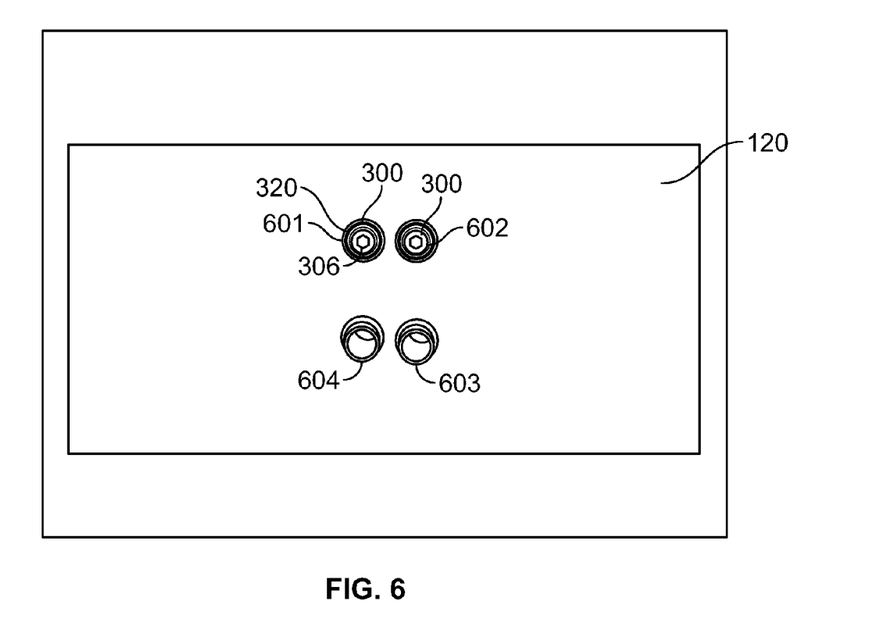
FIG. 6 is a perspective view of a tubesheet having a plurality of tube ends with anvil assemblies installed, according to an example embodiment.

This is repeated for several tubes 111 on the tubesheet 120. FIG. 6 is a perspective view of a tubesheet 120 having a plurality of tube ends 110 with anvil assemblies 320 installed, according to an example embodiment. As shown there are two sites 601, 602 where anvil assemblies 320 are installed at or near tube ends 110. There are two sites 603, 604 where anvil assemblies are not installed. To finish off the joint between the tube sheet and the tube ends, anvil assemblies will have to be installed at the sites 603, 604. Of course, there heat exchangers that have many more tube ends that terminate at the tubesheet 120. The process would be exactly the same for such a tubesheet but the end result would yield more sites that need to have the two band 110 friction stir welded to the tubesheet 120.

Figure 5A:
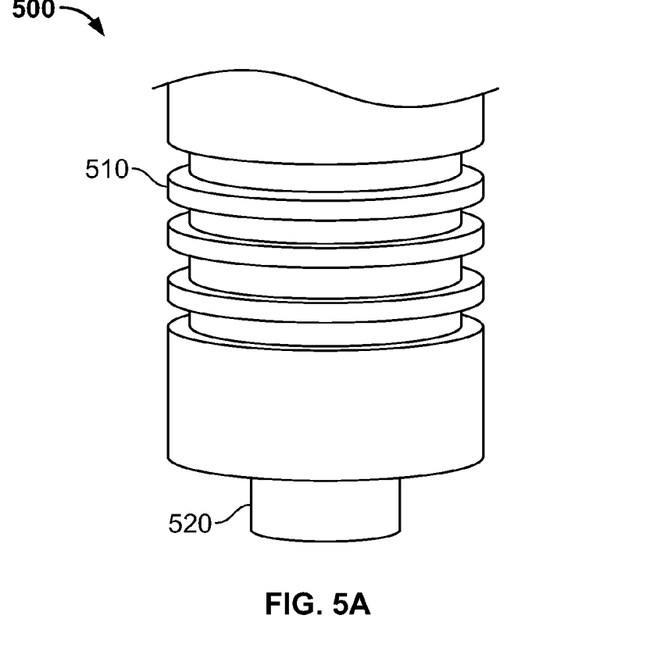
FIG. 5A is a side view illustrating an example of a fixed pin tool or device for use in friction stir welding, according to an example embodiment.

FIG. 5A is a side view illustrating an example of a fixed pin tool 500 or device for use in friction stir welding, according to an example embodiment. There are several different techniques used for friction stir welding processes (e.g., friction stir welding process or self-reacting friction stir welding process). A first technique is a fixed pin tool technique illustrated in FIG. 1A. The fixed pin tool 500 includes a shoulder 510 and a pin 520. The fixed pin tool 500 is made, in one embodiment, from a single piece of material (including the pin 520 and shoulder 510). The length of the pin 520 is constant. The fixed pin tool 500 is used to weld plates or workpieces with a constant thickness.

Figure 5B:
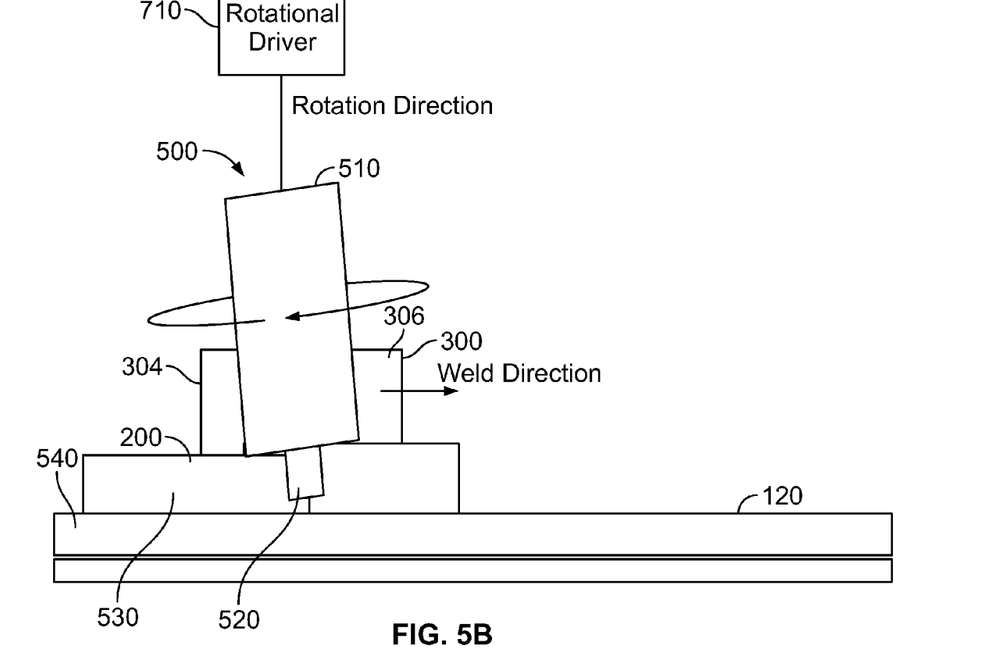
FIG. 5B is a schematic view of a fixed pin tool or device during welding of a workpiece, according to an example embodiment.

FIG. 5B is a schematic view of a fixed pin tool or device during welding of a workpiece, according to an example embodiment. In this embodiment, the pin 520 and the shoulder 510 spin together and do not move independently of each other. During welding, the pin tool device 500 is rotated while simultaneously being translated to traverse the one or more workpieces, such as workpiece 530, in the weld direction. Pressure or a force is applied to the one or more workpieces 530 by the pin tool device 500. The backer or anvil assembly 320 of FIGS. 1A, 1B, 2, 3 and 4 provides support to sustain pressure from the pin tool device 500. The backer or anvil assembly 320 also provides a reactive force to counteract the force placed on the pin tool device 500 during the FSW process. As discussed previously, the pin 520 and shoulder 510 spin together since the pin tool device 500 is made of one solid piece of material. In other embodiments, the pin spins independently of the upper or top shoulder, and the pin can move up and down independently from a shoulder in order to change the pin length so tapered or variable width stock can be welded. The anvil assembly 320 and specifically the anchor 100 also has sufficient thermal mass to absorb a portion of the heat produced by the FSW process. The thermal mass of the anchor 100 prevents it from being welded to the inside of the tube 111. The FSW fixed pin tool 500 is driven at a high rotational speed and plunged into the metal. A driver not only rotates the pin but also translates the pin tool 500 around the tube-to-tubesheet joint letting the pin tool shoulder 510 translate over the tube end 110 and washer 200 but avoiding the socket head cap screw 300 protruding from the center of the tube.

Figure 7:
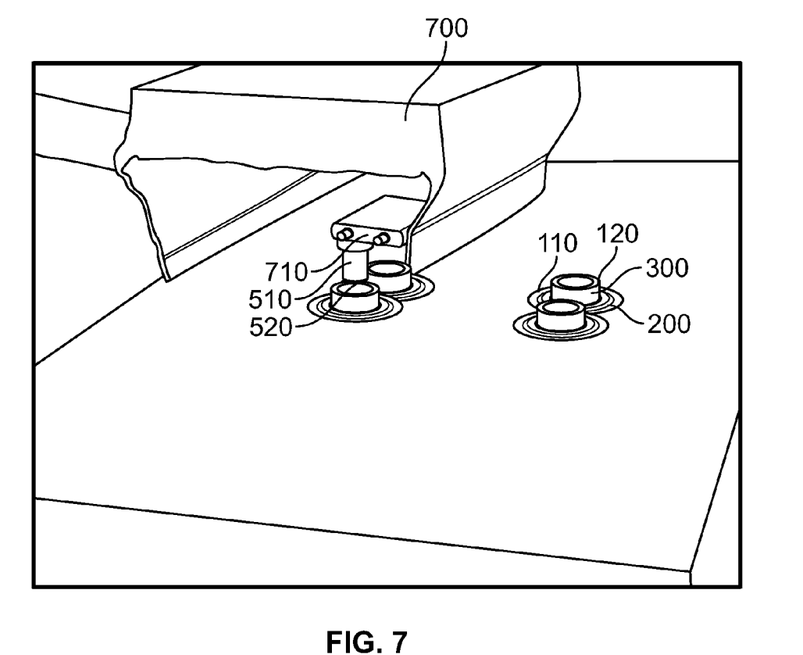
FIG. 7 perspective view of a pin tool performing the friction stir weld (FSW) and moving toward the tube ends with anvils installed, according to the example embodiment.

FIG. 7 perspective view of a pin tool 700 performing the friction stir weld (FSW) and moving toward the tube ends 110 with anvil assemblies 320 installed, according to the example embodiment. The pin tool 700 includes a driver 710 which rotates the pin tool 500, around the tube 111 to tubesheet 120 joints. The pin tool 700, in one embodiment, is controlled by a computerized machine tool. The pin tool 700 thereby translates around in friction stir welds each of the tube ends 110 to the tubesheet 120. Once done with one two to tubesheet joint, the machine tool moves the pin tool 700 to the next tube to tubesheet joint.

Figure 8:
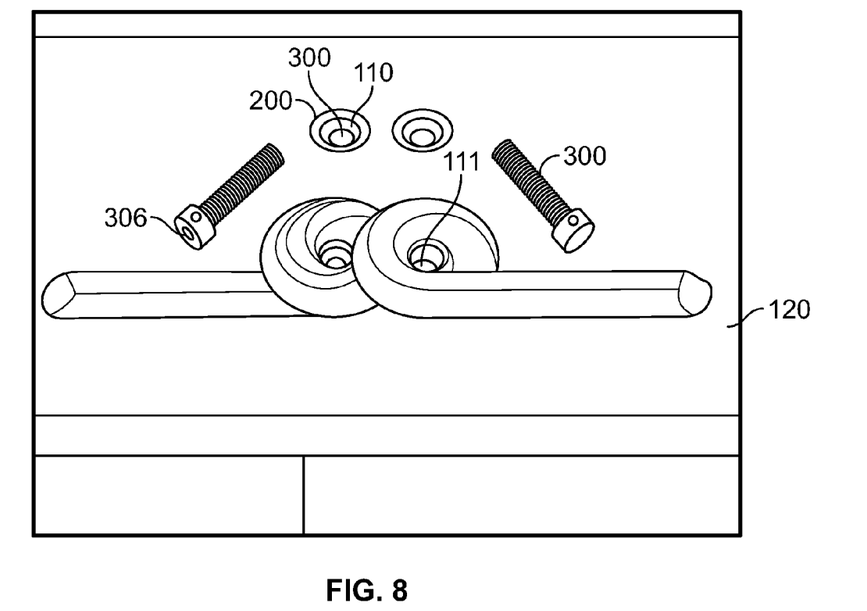
FIG. 8 is a perspective view of two tube ends welded to the tube sheet, according to an example embodiment. Also shown are the unscathed socket cap screws which have been removed from the anchors in the tubes, according to an example embodiment.

FIG. 8 is a perspective view of two tube ends 110 welded to the tube sheet 120, according to an example embodiment. The pin tool 500, 700 leaves a slight indentation or scroll mark at the tubesheet 120. After the welding is complete the socket cap screws 300 can be removed. Also shown, in FIG. 8 are the unscathed socket cap screws 300 which have been removed from the anchors 100 in the tubes 111. After the friction stir welding, the anchors 100 remain in the tubes 111. The washer 200 also covers the tube end 110. The washers 200 are welded to the tops of the tube ends 110. The weld flash and surface scroll marks are removed with machine tools such as a fly-cutter, face mill, end mill, in one embodiment. In another embodiment a grinder, sander, or polisher can be used to remove the necessary depth of material. The necessary depth of material removal is achieved when the outside diameter of the washer's seam and the insider diameter of the tube can be seen.

Figure 9:
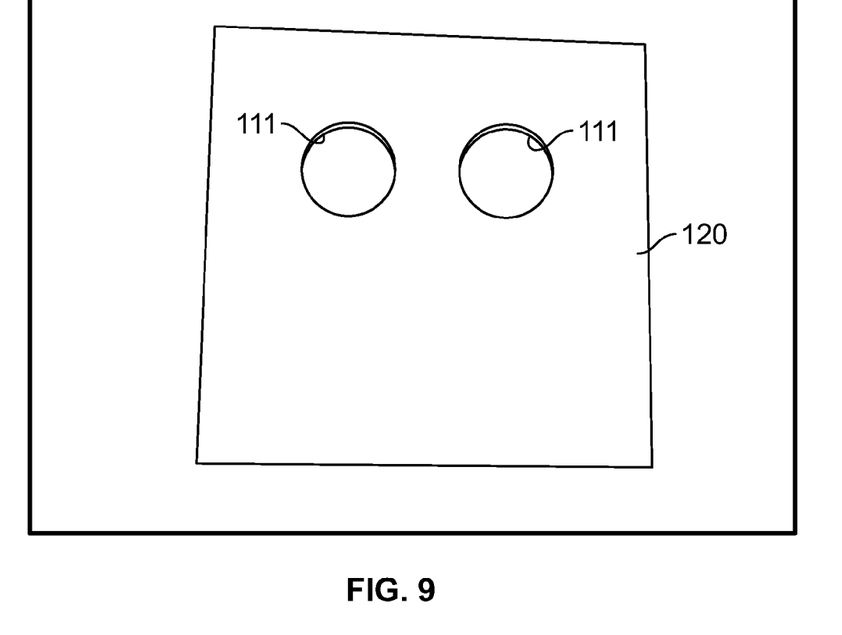
FIG. 9 is a top view of a tube weld after machining and deburring, according to an example embodiment.
Figure 10A:
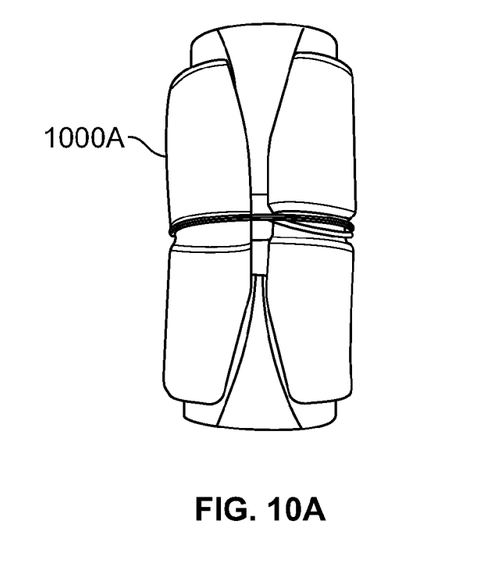
FIG. 10A is a side view of a double wedge anchor, according to another example embodiment.
Figure 10B:
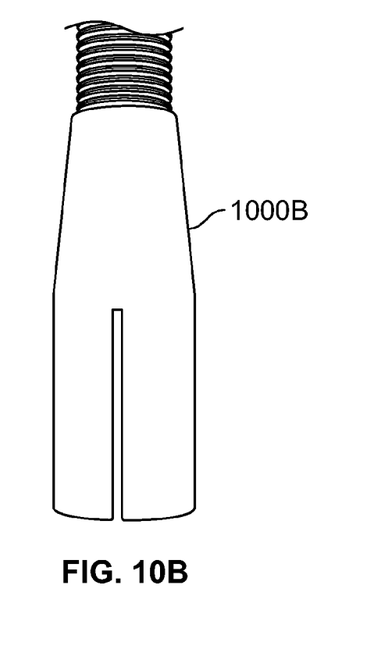
FIG. 10B is a side view of an internally threaded drop-in anchor, according to another example embodiment.
Figure 10C:
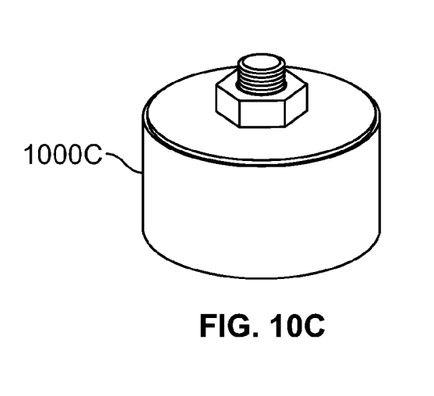
FIG. 10C is a side view of an elastomeric anchor, according to another example embodiment.
Figure 10D:
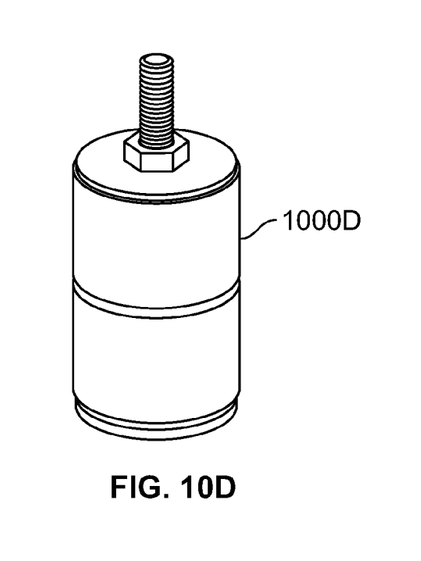
FIG. 10D is a side view of an elastomeric anchor, according to another example embodiment.
Figure 10E:
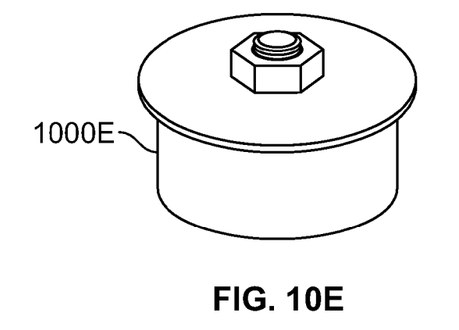
FIG. 10E is a side view of an elastomeric anchor, according to another example embodiment.
Figure 10F:
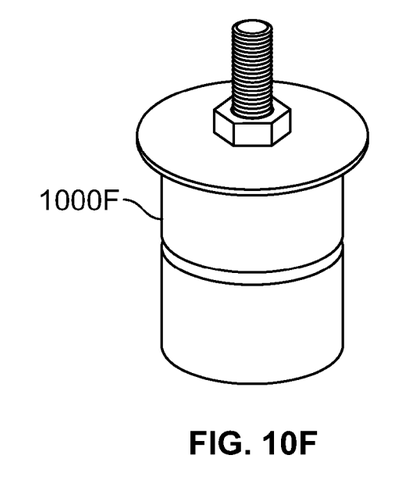
FIG. 10F is a side view of an elastomeric anchor, according to another example embodiment.
Figure 10G:
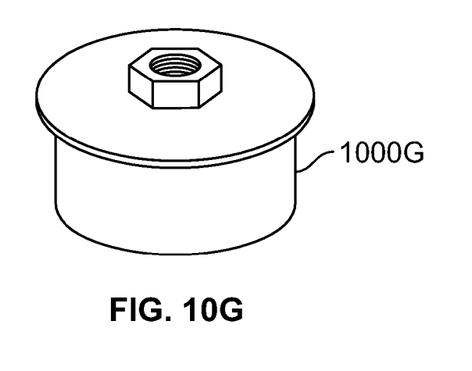
FIG. 10G is a side view of an elastomeric anchor, according to another example embodiment.

FIG. 9 is a top view of a tube weld after machining and deburring, according to an example embodiment. Once the appropriate amount of material has been removed from the tubesheet 120, the anvil 100 and washer 200 combination can be removed by pushing the components from the back side using a metal rod, or by pulling the anvil 100 washer 200 and combination from the surface-side with a tool. The tube 111 inside diameter can then be deburred with a deburring tool or chamfered with a conical drill bit. The end result is shown in FIG. 9. It should be noted that the end result shown in FIG. 9 only includes two tubes 111 welded to the tubesheet 120. In many applications there will be a multitude of tubes 111 welded to the tubesheet 120.

The washer 200 described above is made of the same material as the tube and the tubesheet to promote consistent weld properties and avoid introducing any impurities into the weld. The socket cap screw 300 and anchor 100 do not necessarily have to be the same material since they are not consumed in the weld. It should be noted that the socket cap screw 300 and anchor 100 must have adequate strength and resistance to high temperatures to react to the forces and high temperatures generated from the friction stir weld process. When a heat exchanger is made of low-carbon steel, the washer 200, tube 110, and tubesheet 120 are all low-carbon steel. In the case of welding titanium tubes 110 into a titanium tubesheet 120, the washer 200 would be made from titanium.

The anchor depicted in the above FIGs. Is double wedge anchor. It should be noted that other anchors could be used to form the anvil 100. FIGS. 10A-10G show other anchors 1000A, 1000B, 1000C, 1000D, 1000E, 1000F and 1000G. As shown FIG. 10A, another double wedge anchor 1000A can be used to form part of the anvil 100. As shown FIG. 10B, as an internal threaded drop-in anchor 1000B can be used to form part of the anvil. The anchors 1000C, 1000D, 1000E, 1000F and 1000G all include an elastomeric material which is captured between a first plate in the second plate. When a threaded fastener is tightened the first plate is drawn toward the second plate causing the elastomeric material to be compressed and bulge outwardly. The anchors 1000C, 1000D, 1000E, 1000F and 1000G have the advantage that they are less likely to produce scoring or other markings within the tubes 110. Scoring or other markings at a location may be more susceptible to corrosion. Of course when using an elastomeric material in friction stir welding, the elastomeric material must have sufficient heat resistant qualities to be able to withstand the heat generated by the friction stir welding process. The anchors 1000A, 1000B, 1000C, 1000D, 1000E, 1000F and 1000G all serve the same purpose, in that they expand outward against the inside of the tube 110 wall when a screw 300 is inserted into the internal threads of the anchor 1000A, 1000B, 1000C, 1000D, 1000E, 1000F and 1000G.

In other embodiments, it is contemplated that other alternatives to these types of anchors can be used. The alternatives include spring pins, spring-compressed anchors, press fit pins, tapered pins, and the like. In still other embodiments, the anchor or screw head, such as a socket head cap 300, can be consumed in the weld instead of using a washer to reach against the pin tool shoulder.

Figure 11:
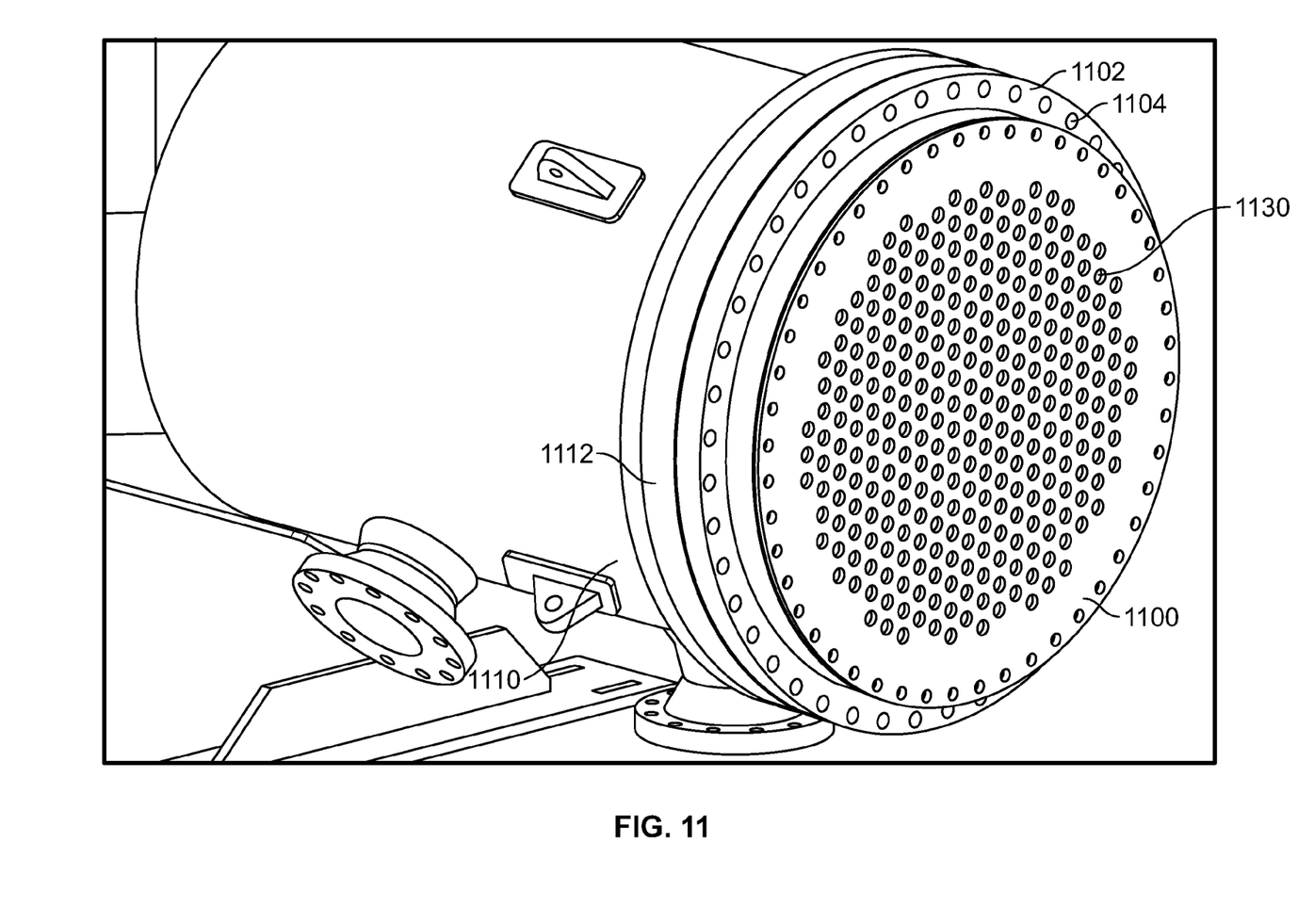
FIG. 11 is a perspective view of a backing anvil baffle plate attached to a flange on the heat exchanger body, according to another example embodiment.

FIG. 11 is a perspective view of a backing anvil baffle plate 1100 attached to a flange on the heat exchanger body 1110, according to another example embodiment. The heat exchanger body 1110 typically includes a flange 1112 or closure flange. In some embodiments the backing anvil baffle plate 1100 is used to hold the free end of the tubes 110 as they are being welded to a tubesheet 120 as described in FIGS. 1-9 above. The backing anvil plate 1100, in one embodiment is approximately ½ inch thick to allow the openings 1130 in the backing anvil plate 1100 to be punched or laser cut instead of drilled reamed. The backing anvil plate 1100 is offset from the flange 1112. The backing anvil plate 1100 also includes a flange 1102 that abuts the flange 1112 of the heat exchanger body 1110. The openings 1104 in the flange 1102 correspond to openings in the flange 1112. Thus, the backing anvil plate 1100 can be bolted or otherwise connected to the flange 1112. The openings 1130 in the backing anvil plate 1100 correspond to the tubes 111 of the heat exchanger.

Figure 12:
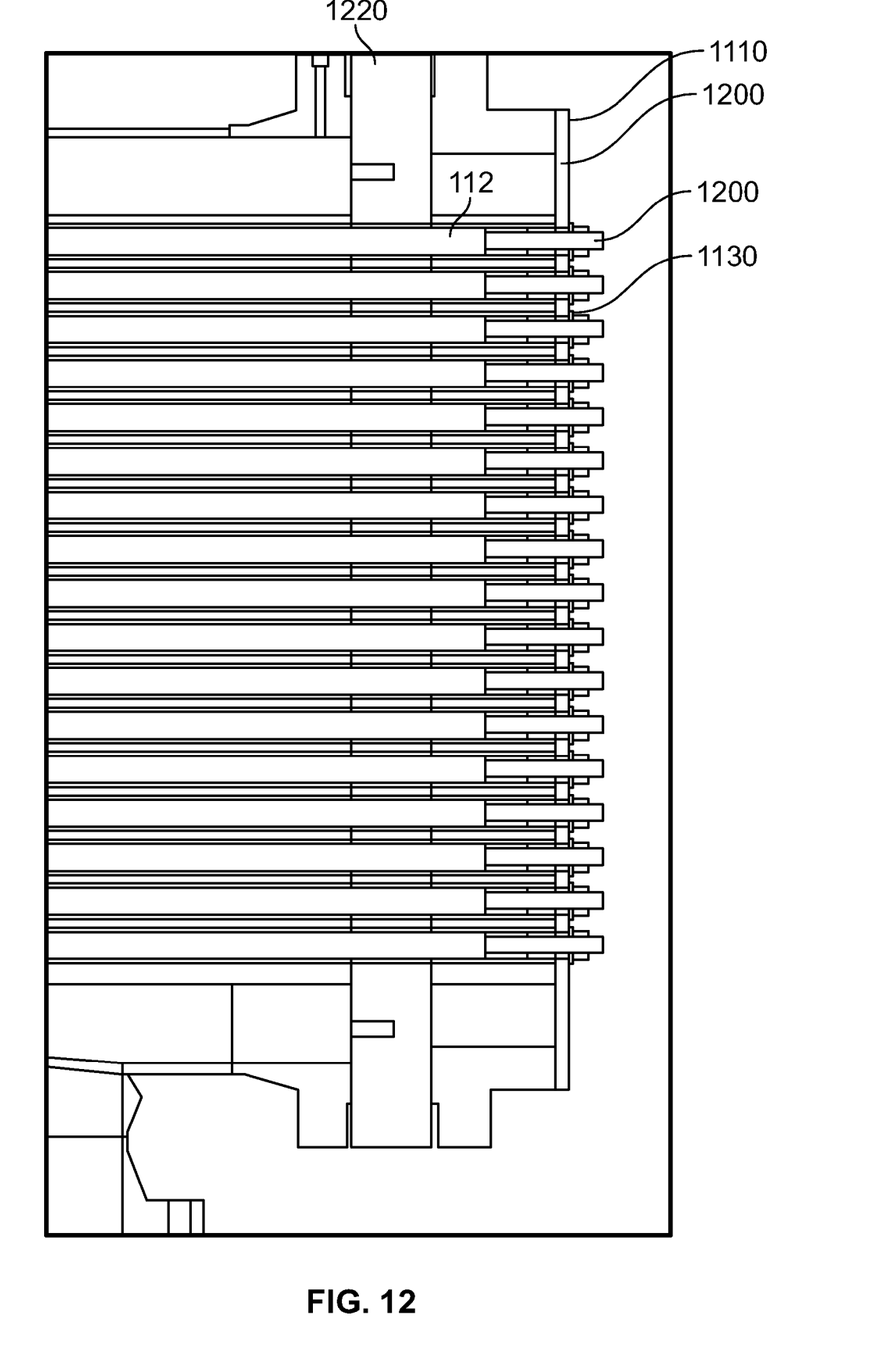
FIG. 12 is a cut away side view of the backing anvil baffle plate and a plurality of elongated anchor assemblies, according to another example embodiment.

FIG. 12 is a cut away side view of the backing anvil baffle plate 1100 and a plurality of elongated anchor assemblies 1200, according to another example embodiment. The elongated anchor assemblies 1200 are used to attach the free ends 112 of the tubes 111 to the backing anvil baffle plate 1100. By using the elongated anchor assemblies 1200 inside the tubes 111 and inside the heat exchanger shell, the tube ends 110 at the tubesheet 120 at the other end of the heat exchanger are further held in place during the friction stir welding process. Anchoring the end of the tubes 111 to the backing anvil baffle plate 1100 prevents translation of the tube ends 110 with respect to the tubesheet 120 (as shown in FIGS. 1 through 9).

Figure 13:
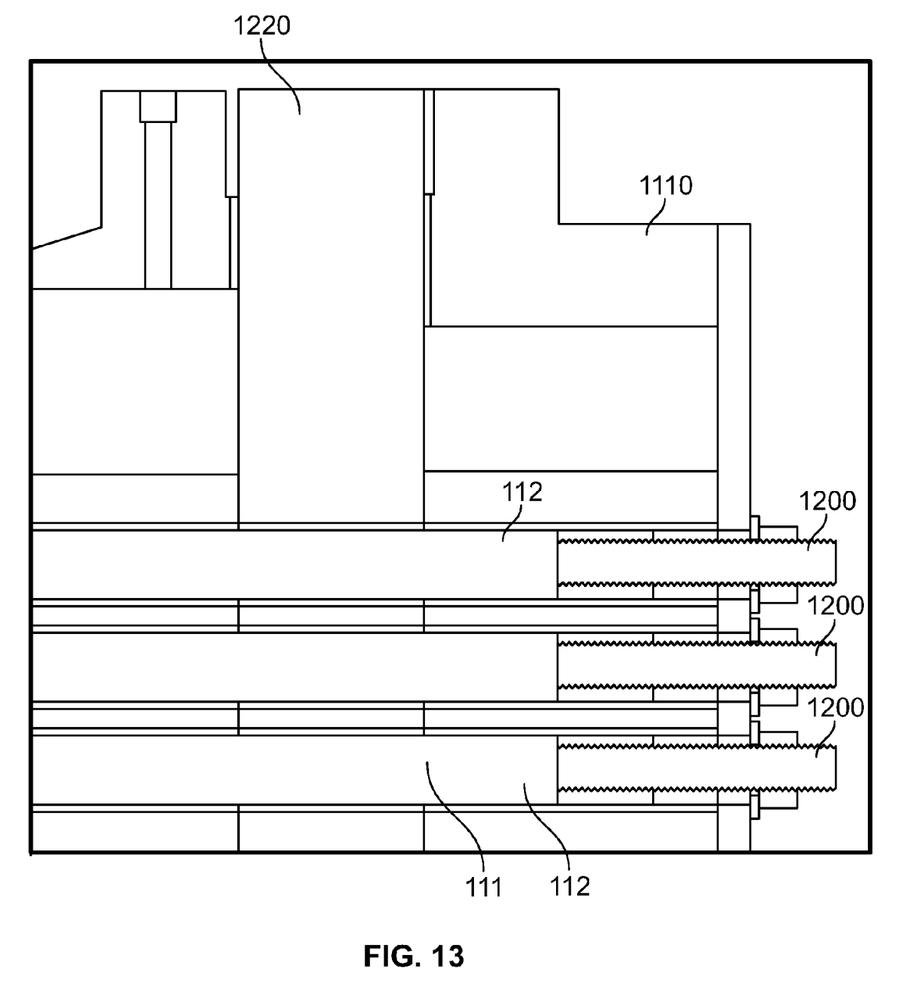
FIG. 13 is a close up view of the backing anvil baffle plate and a plurality of elongated anchor assemblies of FIG. 12, according to another example embodiment.

FIG. 13 is a close up view of the backing anvil baffle plate and a plurality of elongated anchor assemblies 1200 of FIG. 12, according to another example embodiment. The anchor assembly 1200 is approximately 3 inches long. In other embodiments the anchor assembly 1200 can have different lengths. The anchor assembly 1200 is expanded into the free end 112 of the tube 111. The free end 112 of the tube 111 may be slightly expanded after receiving the anchor assembly 1200. However, the free end of the tube 111 is cut off later during the processing when the free end of the tube as cut off is attached to the second tubesheet 1220. Thus there's no risk of calling or contamination at the tube to tubesheet joint formed on the second tubesheet 1220. After the first end 110 of the tube 111 is welded to the tubesheet 120, the anchors 1200 and the backing anvil baffle plate 1100 are removed. The extra length on the free end 112 of the tube 111 is milled down using tube and cutter tools. The free end 112 is then attached to the tubesheet 1220 in the same fashion as described above with respect to FIGS. 1-9.

Figure 14:
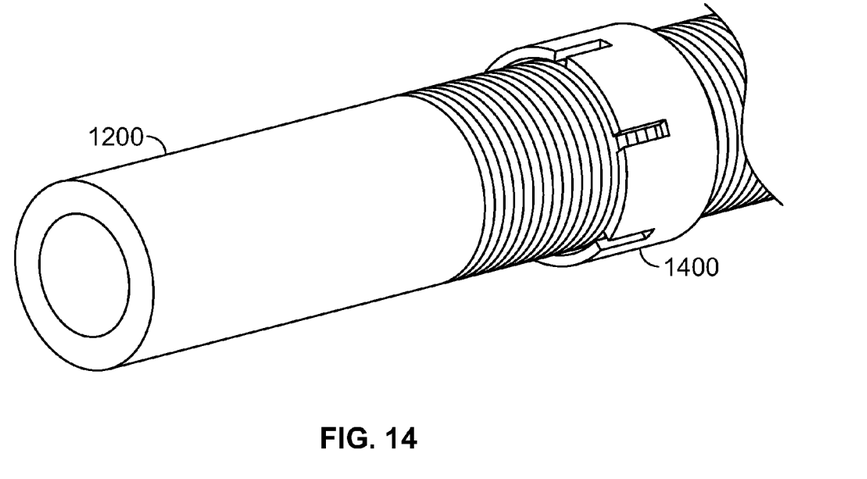
FIG. 14 is a perspective view of the elongated anchor 1200, according to an example embodiment.

FIG. 14 is a perspective view of the elongated anchor 1200, according to an example embodiment. The anchor 1200 includes a threaded portion which carries a collar which fits within the openings 1130 in the backing anvil baffle plate 1100. The anchor assembly 1200 holds the fin tube in position at the tubesheet 120 and at the tubesheet 1220. The threaded tab collar can be integral with the baffle plate 1100 or attached is a separate piece 1400 as shown in FIG. 14. The collars 1400 are designed such that they are sufficiently strong to react to the load produced by the friction stir welding process. In other embodiments of the invention, the free ends of the tubes are epoxy to a baffle plate 1100. Should also be noted that the process described above uses a fixed pin tool. It is contemplated that an adjustable pin tool can also be used to weld tube ends into the tubesheets. With an adjustable pin tool the pin can move up and down with respect to the fixed shoulder. Using the adjustable pin tool the plunge depth of the plunge during the tube to tubesheet weld can be adjusted as needed during the process. In other words, the pin depth can be made shorter when the friction stir process overlaps score marks made on the tubesheet 120 from encircling a previous tube to tubesheet joint that is already been friction stir welded.

Disclosed is a method for forming a joint between a tube and a tubesheet that includes positioning first end of a tube substantially flush with a major surface of a tubesheet, forming an anvil assembly having at least a portion within the tube near the first end, expanding the portion of the anvil assembly within the tube, and welding the tube to the tubesheet. In one embodiment, welding the tube to the tubesheet includes friction stir welding, and expanding the portion of the anvil assembly within the tube includes expanding the portion to hold the tube end with respect to the tubesheet. The anvil assembly used in the above methods includes an anchor. The methods listed for forming a joint between a tube and a tubesheet can include the use of an elastomeric anchor. The method for forming a joint between a tube and a tubesheet for any of the above methods can further include holding the second end of the tube. Holding the second end of the tube includes placing a second anchor in the second end of the tube. Holding the second end of the tube further includes coupling a second anvil assembly to the second end of the tube by extending the second end of the tube through an opening in a second tubesheet, attaching a backing baffle in a substantially fixed relation with the second tubesheet, placing a second anchor into the second end of the tube, and attaching the second anchor to the backing baffle. In any of the above methods can include placing a second anchor into the second end of the tube and expanding the anchor within the second end of tube.

A method for forming a joint between a first tube and a first tubesheet, and a second tube and a second tubesheet includes positioning the first end of the first tube substantially flush with a major surface of the first tubesheet, positioning the second end of the second tube through an opening in the second tubesheet, placing a portion of a first anvil assembly within the tube near the first end, expanding the portion of the anvil assembly within the first end of the tube to hold the first end of the tube with respect to the first tubesheet, holding the second end of the tube with respect to the second end of the second tubesheet, and welding the first end of the tube to the first tubesheet. The method for forming a joint between a first tube and a first tubesheet, and a second tube and a second tubesheet as discussed above wherein welding the first end of the tube to the first tubesheet includes friction stir welding. The method for forming a joint between a first tube and a first tubesheet, and a second tube and a second tubesheet as discussed above wherein holding the second end of the tube with respect to the second tubesheet includes attaching a backing baffle place in an offset position with respect the second tubesheet. The method for forming a joint between a first tube and a first tubesheet, and a second tube and a second tubesheet as discussed above wherein holding the second end of the tube with respect to the second tubesheet includes attaching the second end of the tube to the backing baffle. The method for forming a joint between a first tube and a first tubesheet, and a second tube and a second tubesheet as discussed above wherein attaching the second end of the tube to the backing baffle includes attaching a second anvil assembly to the second end of the tube and to the backing baffle. The method for forming a joint between a first tube and a first tubesheet, and a second tube and a second tubesheet as discussed above, wherein the second end of the tube is removed so that the second end can be formed that is substantially flush to the second tubesheet. The method for forming a joint between a first tube and a first tubesheet, and a second tube and a second tubesheet of the above methods further comprising welding the second end of the tube to the second tubesheet. The method for forming a joint between a first tube and a first tubesheet, and a second tube and a second tubesheet of the above methods wherein welding the second end of the tube to the second tubesheet.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A method for forming a joint between a tube and a tubesheet comprising:
    positioning a first end of a tube substantially flush with a major surface of a tubesheet, the tube having a substantially same outer diameter from the first end of the tube to a second end of the tube, the outer diameter of the tube being substantially equal to an inner diameter of an opening in the tubesheet;
    inserting an anvil assembly comprising an expandable anchor portion at least partially within the first end of the tube;
    coupling a tool to the anvil assembly and rotating the tool to expand the expandable anchor portion;
    welding the first end of the tube to the tubesheet;
    coupling the tool to the anvil assembly and rotating the tool to contract the expandable anchor portion; and
    removing the anvil assembly from the tube.

2. A method for forming a joint between a first tube and a first tubesheet, and a second tube and a second tubesheet comprising:
    positioning a first end of the first tube substantially flush with a major surface of the first tubesheet, the first tube having a substantially same outer diameter from the first end of the first tube to a second end of the first tube, the outer diameter of the first tube being substantially equal to an inner diameter of an opening in the tubesheet;
    positioning a second end of the first tube through an opening in the second tubesheet, the outer diameter of the first tube being substantially equal to an inner diameter of an opening in the second tubesheet;
    inserting a first anvil assembly comprising an expandable anchor portion at least partially within the first end of the first tube;
    placing a washer over the first anvil assembly, the washer having an outer diameter sized to fit within an inner diameter of the first end of the first tube, the washer being placed at least partially within the first end of the first tube;
    expanding the expandable anchor portion of the first anvil assembly while the first anvil assembly is within the first end of the first tube to hold the first end of the first tube with respect to the first tubesheet;
    holding the second end of the first tube with respect to the second end of the second tubesheet; and
    welding the first end of the first tube to the first tubesheet.

3. The method for forming a joint between a first tube and a first tubesheet, and a second tube and a second tubesheet of claim 2 wherein welding the first end of the first tube to the first tubesheet includes friction stir welding.

4. The method for forming a joint between a first tube and a first tubesheet, and a second tube and a second tubesheet of claim 2 wherein holding the second end of the first tube with respect to the second tubesheet includes attaching a backing baffle place in an offset position with respect the second tubesheet.

5. The method for forming a joint between a first tube and a first tubesheet, and a second tube and a second tubesheet of claim 4 wherein holding the second end of the first tube with respect to the second tubesheet includes attaching the second end of the first tube to the backing baffle.

6. The method for forming a joint between a first tube and a first tubesheet, and a second tube and a second tubesheet of claim 5 wherein attaching the second end of the first tube to the backing baffle includes attaching a second anvil assembly to the second end of the first tube and to the backing baffle.

7. The method for forming a joint between a first tube and a first tubesheet, and a second tube and a second tubesheet of claim 2, the second end of the first tube is removed so that the second end can be formed that is substantially flush to the second tubesheet.

8. The method for forming a joint between a first tube and a first tubesheet, and a second tube and a second tubesheet of claim 7 further comprising welding the second end of the first tube to the second tubesheet.

9. A method for forming a joint between a tube and a tubesheet comprising:
    positioning a first end of a tube substantially flush with a major surface of a tubesheet, the outer diameter of the tube being substantially the same along the length of the tube, the outer diameter substantially equal to the inner diameter of an opening in the tubesheet;

forming an anvil assembly having at least a portion within the tube near the first end;

expanding the portion of the anvil assembly while the anvil assembly is within the tube, the anvil assembly serving as a removable backer to allow welding of the tube to the tubesheet;

placing a washer over the anvil assembly and onto the interface between the first end of the tube and the major surface of the tubesheet; and welding the tube to the tubesheet, the washer being at least partially consumed during welding.

10. The method for forming a joint between a tube and a tubesheet of claim 9 wherein the washer, the tubesheet and the tube are made of substantially the same material.

11. The method for forming a joint between a tube and a tubesheet of claim 9 wherein welding the tube to the tubesheet includes friction stir welding.

12. A method for forming a joint between a tube and a tubesheet comprising:

positioning a first end of a tube substantially flush with a major surface of a tubesheet, the outer diameter of the tube being substantially equal along the length of the tube and substantially equal to the inner diameter of an opening in the tubesheet;

forming an anvil assembly having at least a portion within the tube near the first end;

expanding the portion of the anvil assembly while the anvil assembly is within the tube, the anvil assembly serving as a removable backer to allow welding of the tube to the tubesheet; placing a washer over the anvil assembly and onto the interface between the first end of the tube and the major surface of the tubesheet; and welding the tube to the tubesheet.

13. The method of claim 12 wherein the washer, the tube, and the tubesheet are made of substantially the same material.

14. The method for forming a joint between a tube and a tubesheet of claim 12 wherein welding the tube to the tubesheet includes friction stir welding.

15. The method for forming a joint between a tube and a tubesheet of claim 12 wherein expanding the portion of the anvil assembly within the tube includes expanding the portion to hold the tube end with respect to the tubesheet.

16. The method for forming a joint between a tube and a tubesheet of claim 12 wherein the anvil assembly includes an anchor.

17. The method for forming a joint between a tube and a tubesheet of claim 12 wherein the portion of the anvil assembly within the end of the tube is an elastomeric anchor.

18. The method for forming a joint between a tube and a tubesheet of claim 12 further comprising holding a second end of the tube.

19. The method for forming a joint between a tube and a tubesheet of claim 18 wherein holding the second end of the tube includes placing a second anchor in the second end of the tube.

20. The method for forming a joint between a tube and a tubesheet of claim 18 wherein holding the second end of the tube further comprises coupling a second anvil assembly to the second end of the tube which further comprises:

extending the second end of the tube through an opening in a second tubesheet;

attaching a backing baffle in a substantially fixed relation with the second tubesheet;

placing a second anchor into the second end of the tube; and attaching the second anchor to the backing baffle.

21. The method for forming a joint between a tube and a tubesheet of claim 20 wherein placing the second anchor into the second end of the tube includes expanding the anchor within the second end of tube.

* * * * *